United States Patent Office 2,805,952
Patented Sept. 10, 1957

2,805,952

LEATHER PASTING

George K. Greminger, Jr., Midland, and Miles A. Weaver, Ithaca, Mich., assignors to The Dow Chemical Company, Midland, Mich., a corporation of Delaware No Drawing. Application August 10, 1954, Serial No. 449,007

7 Claims. (Cl. 106—141)

This invention relates to an improvement in leather pasting, and to a composition for use in pasting leather or hides to panels prior to drying.

The drying of hides and of tanned leather traditionally resulted in loss of leather values because of the prevalent practice of tacking or clamping the stretched leather to flat panels for stretching and drying. Such practice results in a 5 to 7 percent loss, due to the need for trimming the unstretched and curled or wrinkled margins from the dried product and due to marginal perforations when tacks are used. To overcome this problem and to increase the yield of usable leather, there has been adopted in parts of the industry the practice of pasting the wet leather to flat panels for drying.

In the leather pasting operations heretofore employed, the common starch, dextrin or gum adhesives have been used. These have several disadvantages. Thus, when such pastes are made up considerably in advance, they tend to retrograde due to bacterial, mycotic or enzymatic action. Some of them gel irreversibly on ageing. Their aged solutions, then, do not have the required tackiness, and poor adhesion to the drying panel is obtained. If fresh pastes are used, those which have the required wet tackiness do not flow out evenly on the surfaces to which they will be applied, and those which are sufficiently fluid are deficient in adhesive qualities.

For the foregoing and related reasons, it is desired to provide improved adhesives for use in leather pasting which spread evenly when brushed or sprayed on leather surfaces or on the wood, ceramic or vitreous surfaces to which the leather is to be pasted, and which have a high degree of tackiness when so applied and for some time thereafter. This is the principal object of the present invention. Other objects include the provision of adhesives which are sufficiently resistant to attack by microorganisms and to gelation under normal storage conditions to permit their storage and use over prolonged periods. A particular object is to provide such an adhesive which retains its adhesive properties so as to prevent the pasted leather from dropping off the drying panels. Another object is to provide an adhesive having the property of holding leather more firmly to the drying panel when the pasted assembly is heated to hasten drying than in the cold. An important object is the provision of such an adhesive which, after drying is completed, parts cleanly from the dried leather and may be washed easily from the panel.

These objects are attained by the provision and use of a particular type of adhesive composition consisting essentially of a water solution of a water-soluble cellulose ether having a thermogelation point between 45° and 75° C., a water-soluble plasticizer for the cellulose ether, a small amount relative thereto of casein and a still smaller amount of a water-soluble nitrogenous organic base which forms neutral or slightly alkaline (pH 7 to 8) aqueous solutions with casein, all as described more fully hereinafter.

The water-soluble cellulose ethers having the property of gelling in water when heated to 45° to 75° C. are the water-soluble methyl and ethyl celluloses generally having not over 1.5 to 2 methyl or ethyl groups per $C_6H_{10}O_5$ unit, and their hydroxyethyl and hydroxypropyl substitution products having up to 0.8 of the hydroxyalkyl groups per $C_6H_{10}O_5$ unit.

The water-soluble plasticizers for such cellulose ethers, as is well known, are generally polyhydric alcohols such as ethylene or propylene glycols, the water-soluble polyalkylene glycols, glycerol, pentaerythritol, mannitol and sorbitol.

To be used in water solution, casein must be solubilized by the presence of an alkaline agent. The inorganic alkaline agents have faults which make them undesirable in leather pasting compositions. Thus, alkali metal hydroxides may injure the hides, ammonia makes the dried adhesive water resistant and difficult to wash from the panel, and borax is not compatible with the cellulose ethers of the present adhesives. Any of a wide variety of organic amines may be used. The requirements are that the amine be soluble in water and that it give neutral or only slightly alkaline solutions when present with from 3 to 20 times its weight of casein. The particularly useful amines are the water-soluble alkyl and polyalkyl amines, alkylene and polyalkylene polyamines, alkanol and polyalkanol amines, N-alkyl alkanol amines, aminoalkyl alkanolamines, and dialkylene imine oxides. Examples of such amines are the mono-, di- and tri- methyl, ethyl, propyl and butylamines; ethylene diamine, diethylene triamine, tetraethylene pentamine; mono-, di- and triethanolamine and the corresponding 2-propanolamines; N-ethyl ethanolamine; aminoethyl ethanolamine, aminoethyl 2-propanolamine; and morpholine.

A simple test will show whether other amines, not specifically named above, are useful in the invention. In the test, 15 parts by weight of casein is soaked for 30 minutes in 80 to 85 parts of water at room temperature. The resulting mixture is stirred and warmed to 60° C. and from 5 to 15 percent of the test amine is added, based on the weight of casein. This mixture is held at 60° C. for 30 minutes, while stirring. The pH of the mixture is determined. The useful amines give smooth casein solutions whose pH is in the range from 7 to 8. Results of this test with a variety of amines are given below.

| Amine | pH of amine | Amount of amine, percent of wt. of casein | pH of solution of casein and amine |
|---|---|---|---|
| Aminoethyl isopropanolamine | 9 | 5 | 7 |
| Monoethanolamine | 10 | 5 | 7 |
| Diethanolamine | 9 | 5 | 7 |
| Triethanolamine | 9 | 5 | 7 |
| N-ethyl ethanolamine | 9 | 5 | 7 |
| Tetraethylene pentamine | 9 | 5 | 8 |
| Aminoethyl ethanolamine | 10 | 5 | 7 |
| Aminoisopropyl ethanolamine | 9 | 5 | 7 |
| Diethylaminoethanol | 10 | 5 | 7 |
| Monoisopropanolamine | 9 | 10 | 7 |
| Morpholine | 10 | 10 | 7 |
| Ethylamine | 11 | 10 | 7 |
| Diisopropanolamine | 8 | 10 | 7 |
| Ethylene diamine | 11 | 5 | 8 |
| Diethylene triamine | 9 | 5 | 7 |
| Triethylene tetramine | 9 | 5 | 8 |

The new paste compositions are water-solutions of the several constituents in the following relative proportions:

| Material | Percent of solute, by weight |
|---|---|
| Cellulose ether | 81–93.95 |
| Plasticizer | 15– 5. |
| Casein | 3– 1. |
| Amine | 1– 0.05 |

The preferred range of proportions, for most consistent results, is:

| Material | Percent of solute, by weight |
|---|---|
| Cellulose ether | 85.5–90.9 |
| Plasticizer | 12 – 8 |
| Casein | 2 – 1 |
| Amine | 0.5– 0.1 |

The amount of water used to dissolve the above-named constituents is chosen to give the solution the proper viscosity for brushing or spraying, as desired, and will vary according to the molecular weight or "viscosity type" of the cellulose ether employed. The commercial water-soluble cellulose alkyl ethers and mixed alkyl, hydroxyalkyl ethers useful in the present invention are supplied in each of several viscosity types, the numerical designation of which indicates the viscosity of a 2 percent solution by weight of that ether in water at 20° C. Concentration-viscosity charts are available for each of these ethers, so that, knowing the viscosity desired in the paste, the types and concentrations of cellulose ethers which can yield solutions in the desired range are determined readily.

In a specific example, illustrative of the invention, a stock solution of casein was prepared by soaking 15 parts by weight of casein for 30 minutes in 83.5 parts of water at room temperature, then heating the mixture to 60° C. and stirring for 30 minutes during and after addition of 1.5 parts by weight of morpholine. There was also prepared at 2 percent solution by weight of methyl cellulose (4000 centipoise viscosity type) in water, to which was added 10 percent each of propylene glycol and of the casein solution, based on the weight of methyl cellulose. The resulting solution contained the following percentages of each solute:

| | |
|---|---|
| Methyl cellulose | 89.54 |
| Propylene glycol | 8.97 |
| Casein | 1.35 |
| Morpholine | 0.14 |

The composition spread readily and smoothly when brushed onto plywood, glass or ceramic drying panels. Wet leather was pressed on the panels and adhered smoothly thereto, both while wet and when the so-mounted leather was passed through a drying oven. There was no drop-off in the oven. When dried, the leather was stripped easily from the panels and was found to be clean. The dried adhesive remained on the panels but was easily flushed off with cold water. The stock paste solution was stable for several weeks and showed no viscosity change and no evidence of microbial degradation. In contrast, a starch paste could only be kept a few days without serious degradation and, even when fresh its use was attended by a 5 to 10 percent drop-off of leather from the panels in the drying tunnel and by the necessity to scrape dried adhesive from the stripped leather and from the panel.

Tests have shown that the water-soluble cellulose ether may be water-soluble methyl cellulose, ethyl cellulose, methyl hydroxyethyl cellulose, ethyl hydroxyethyl cellulose, methyl hydroxypropyl cellulose or ethyl hydroxypropyl cellulose of any viscosity type, whose water solutions gel when heated to some temperature in the range from 45° to 75° C. Compositions of any of these cellulose ethers with a polyhydric alcohol plasticizer, casein and a casein-solubilizing amine in the proportions previously defined may be adjusted to spraying or brushing viscosities and have the desired combination of stability, tackiness when wet, strong adhesion during drying, ease of stripping from leather when dry, and ease of flushing from the drying boards.

We claim:

1. A liquid adhesive composition, especially adapted for leather pasting, consisting essentially of a water solution of (a) from 81 to 93.95 percent, based on the total weight of solute, of a water-soluble cellulose ether having a gel point between 45° and 75° C. and containing from 1.5 to 2 alkyl groups of from 1 to 2 carbon atoms and from 0 to 0.8 hydroxyalkyl groups of from 2 to 3 carbon atoms per $C_6H_{10}O_5$ unit; (b) from 5 to 15 percent of a water-soluble plasticizer for the cellulose ether; (c) from 1 to 3 percent of casein; and, (d) from 0.05 to 1 percent of a water-soluble amine, the concentration of the solute in water being adjusted to provide a solution whose viscosity is appropriate to the intended method of application of the adhesive; the amine being one which gives smooth aqueous solutions of casein with a pH from 7 to 8 when 15 parts by weight of casein is soaked for 30 minutes at room temperature in 80 to 85 parts of water, the resulting mixture is stirred and warmed to 60° C., 5 to 15 percent of the amine is added, based on the weight of casein, and the mixture is held at 60° C. for 30 minutes while stirring.

2. The composition claimed in claim 1, wherein the amount of cellulose ether in the solute is from 85.5 to 90.9 percent, that of the plasticizing polyhydric alcohol is from 8 to 12 percent, that of casein is from 1 to 2 percent, and that of the casein-solubilizing amine is from 0.1 to 0.5 percent.

3. The composition claimed in claim 1, wherein the cellulose ether is water-soluble methyl cellulose.

4. The composition claimed in claim 1, wherein the plasticizer is propylene glycol.

5. The composition claimed in claim 1, wherein the casein-solubilizing amine is morpholine.

6. The composition claimed in claim 1, wherein the casein-solubilizing amine is an alkanolamine.

7. The composition claimed in claim 1, wherein the casein-solubilizing amine is an ethylene polyamine.

References Cited in the file of this patent

UNITED STATES PATENTS

| | | |
|---|---|---|
| 1,811,972 | Schmidt | June 30, 1931 |
| 2,145,855 | Bley | Feb. 7, 1939 |
| 2,309,380 | Brother et al. | Jan. 26, 1943 |
| 2,340,072 | Medl | June 25, 1944 |
| 2,347,494 | Meigs | Apr. 25, 1944 |
| 2,426,935 | Kramsky | Sept. 2, 1947 |
| 2,488,907 | Griffin et al. | Nov. 22, 1949 |

FOREIGN PATENTS

| | | |
|---|---|---|
| 242,467 | Germany | Jan. 10, 1912 |